United States Patent
Reinpoldt, III

(10) Patent No.: US 7,781,717 B2
(45) Date of Patent: *Aug. 24, 2010

(54) SYSTEM AND METHOD FOR MANIPULATING REAL-TIME VIDEO PLAYBACK TIME-SYNCHRONIZED WITH MILLIMETER WAVE IMAGERY

(75) Inventor: Willem H. Reinpoldt, III, Windermere, FL (US)

(73) Assignee: Brijot Imaging Systems, Inc., Lake Mary, FL (US)

( * ) Notice: Subject to any disclaimer, the term of this patent is extended or adjusted under 35 U.S.C. 154(b) by 15 days.

This patent is subject to a terminal disclaimer.

(21) Appl. No.: 12/110,508

(22) Filed: Apr. 28, 2008

(65) Prior Publication Data
US 2008/0266172 A1 Oct. 30, 2008

Related U.S. Application Data

(60) Provisional application No. 60/914,335, filed on Apr. 27, 2007.

(51) Int. Cl.
*H01L 27/00* (2006.01)
(52) U.S. Cl. ............... 250/208.1; 250/559.4

(58) Field of Classification Search ............ 250/221, 250/222.1, 214.1, 208.1, 559.4, 559.44, 336.1; 382/100–107, 254–279; 345/7–9
See application file for complete search history.

(56) References Cited

U.S. PATENT DOCUMENTS 6,828,556 B2 * 12/2004 Pobanz et al. ............ 250/336.1

* cited by examiner

*Primary Examiner*—Que T Le
(74) *Attorney, Agent, or Firm*—McKinney Law, PLLC

(57) ABSTRACT

A system and method for manipulating real-time video playback time-synchronized with millimeter wave imagery is disclosed. In a particular embodiment, millimeter wave imagery and visible spectrum video images are combined to form composite images in real-time to detect concealed objects on a person. A graphical user interface (GUI) manipulates the displayed millimeter wave imagery, video images and composite images and controls displaying user selected portions of the synchronized recorded images. The composite images are automatically encoded with event data when a concealed object is detected and an alert is generated, or that information is accessed from a datafile or database structure. The GUI controls the playback and viewing of those composite images having encoded event data.

20 Claims, 3 Drawing Sheets

SYSTEM AND METHOD FOR MANIPULATING REAL-TIME VIDEO PLAYBACK TIME-SYNCHRONIZED WITH MILLIMETER WAVE IMAGERY

I. CROSS REFERENCE TO RELATED APPLICATIONS

This application claims the benefit of U.S. Provisional Application No. 60/914,335 filed Apr. 27, 2007. The disclosure of the provisional application is incorporated herein by reference.

II. FIELD

The present invention relates in general to the field of video playback systems, and in particular to a method and system for manipulating real-time video playback time-synchronized with millimeter wave imagery.

III. DESCRIPTION OF RELATED ART

A passive millimeter wave camera has the ability to detect and image objects hidden under clothing using millimeter wave imagery. The passive millimeter wave camera detects radiation that is given off by all objects. The technology works by contrasting the millimeter wave signature of the human body, which is warm and reflective, against that of a gun, knife or other contraband. Those objects appear darker or lighter because of the differences in temperature, hence, millimeter wave energy, between the human body and the inanimate objects.

An object-based scene is generated for viewing on a video monitor with individual objects having spatial and temporal relationships. The objects may be created in any number of ways, including signals from a passive millimeter wave camera and/or signals from a visible spectrum video camera. The signals are recorded for playback and review. Video playback controls, such as Play, Pause, Rewind, Skip Forward/Back, Forward-Fast, have been used previously in commercial and consumer electronics including voice/music/video recorders, computer video players (QuickTime and Windows Media Player), and the like. However, no adequate method or system has been provided for using such controls to manage and control multiple dissimilar sources such as signals from a millimeter wave camera and video signals that are time synchronized with each other to produce a composite image. Accordingly, there is a need in the relevant art for a system and method that has the ability to manipulate real-time video playback time-synchronized with millimeter wave imagery.

There is also a need in the art for a system and method of real-time video playback time-synchronized with millimeter wave imagery that synchronizes visible spectrum images and the millimeter wave imagery seamlessly across the entire functionality of a graphical user interface ("GUI").

Another need exists in the art for a system and method of real-time video playback time-synchronized with millimeter wave imagery that is intuitive and easy to use to review past imagery via "video player"-like controls.

Another need exists in the art for a system and method of real-time video playback time-synchronized with millimeter wave imagery that generates an alert that a new real-time threat event has been detected by way of sound, flashing colors or indicators on the GUI, printed message or icon on the GUI, or a combination thereof.

Another need exists in the art for a system and method of real-time video playback time-synchronized with millimeter wave imagery having the ability to instantly jump to recorded images of threat events within the standard GUI.

Another need exists in the art for a system and method of real-time video playback time-synchronized with millimeter wave imagery that optionally and automatically releases the video playback of previous imagery in favor of real-time imagery when a real-time threat has been detected.

However, in view of the prior art at the time the present invention was made, it was not obvious to those of ordinary skill in the pertinent art how the identified needs could be fulfilled.

IV. SUMMARY

In a particular embodiment, a method for manipulating real-time video playback time-synchronized with millimeter wave imagery is disclosed. The method includes providing a visible spectrum camera and a millimeter wave camera. The method further includes combining visible spectrum imagery with processed millimeter wave imagery using a processing software module in an easy-to-use graphical user interface (GUI) together with operator controls and data.

In another particular embodiment, a system includes computer hardware, software and external devices such as frame buffers, millimeter wave sensor controllers, hard disk drives and the like. A seamless, synchronized, intuitive display of imagery from multiple sources including visible spectrum video cameras and millimeter wave cameras is provided. In addition, replaying previous synchronized imagery from the visible spectrum video and millimeter wave cameras is quick, easy, integrated and intuitive.

One particular advantage provided by the embodiments of the system and method for manipulating real-time video playback time-synchronized with millimeter wave imagery is that a synchronization software module synchronizes the visible spectrum imagery with the millimeter wave imagery, which are generated from different sensors at differing resolutions, formats, bandwidths and frequency. Another advantage provided by the embodiments of the system and method is that reviewing previously acquired and processed imagery through the use of time synchronized video playback is easily accessed using a control software module.

Another particular advantage provided by the embodiments of the system and method for real-time video playback time-synchronized with millimeter wave imagery is that the need to exit the main GUI in order to view previously recorded images is eliminated. Another advantage provided by the disclosed embodiments is that the automatic notification of new real-time threats during previous image playback is provided by an encoding software module to eliminate the possibility of missed threat detection. In addition, the performance and ease of use of the threat detection system is improved by providing the operator unparalleled access to previously recorded events across dissimilar synchronized cameras and improves the reliability of operator threat assessments by providing a simple and fast method of reassessing past threat indications.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Millimeter wave cameras are detection devices that are operative to detect differences or contrast between millimeter wave energy (e.g. electromagnetic wave energy lying in the 80-100 GHz range) that is naturally emitted by the body of an individual and millimeter wave energy that is emitted, reflected, absorbed or otherwise attenuated by any object concealed on that individual. A standard video camera is operative to produce continuous dynamic images on a real-time basis that relate spatially and temporally to the millimeter wave imagery.

The millimeter wave contrast-based imagery is combined with the images of the individual produced by the visible spectrum video camera to realize a set of composite images. The composite images show both the individual being scanned and also any concealed object(s) revealed by the contrast-based imagery that was generated in conjunction with the millimeter wave cameras.

Figure 1:
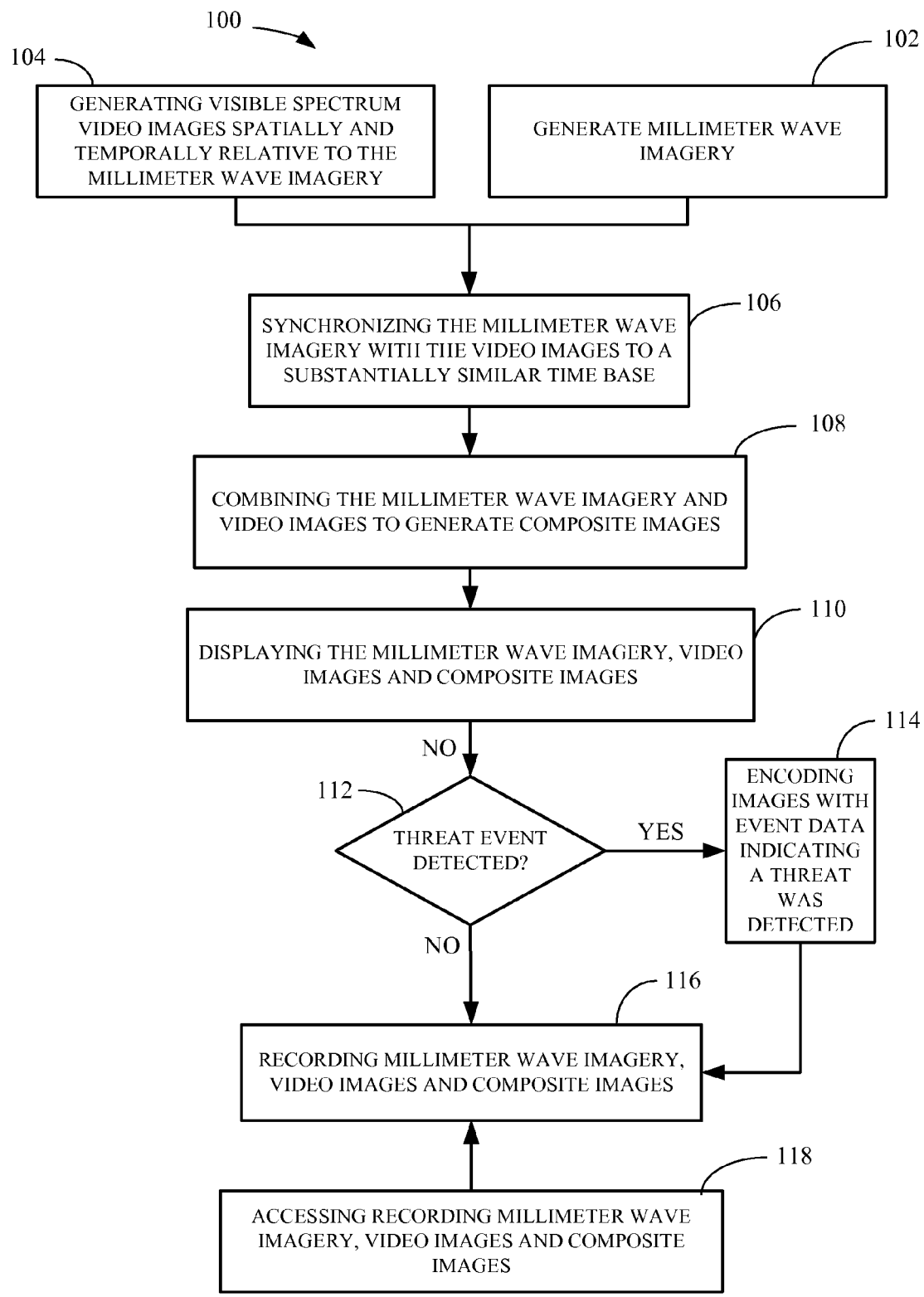
FIG. 1 is a flow diagram of a particular embodiment of a method of manipulating real-time video playback time-synchronized with millimeter wave imagery.

Referring to FIG. 1, a particular illustrative embodiment of a method of manipulating real-time video playback time-synchronized with millimeter wave imagery is disclosed and generally designated 100. Millimeter wave imagery is generated at 102. Visible spectrum video images that are spatially and temporally relative to the millimeter wave imagery are generated at 104. Next, millimeter wave imagery and the video images are synchronized to a substantially similar time base at 106. Once the millimeter wave imagery and video images are synchronized, the images are combined at 108 to generate composite images. The composite images, video images and the millimeter wave imagery can be displayed at 110, or any combination thereof. If a threat event is detected at 112, then at 114 the images are encoded with event data indicating a threat was detected then recorded at 116. A sequence of recorded images may include interspersed images having encoded event data indicating a threat within the recorded images not having encoded event data. The recorded millimeter wave imagery, video images and composite images are accessed at 118 for playback and review.

Figure 2:
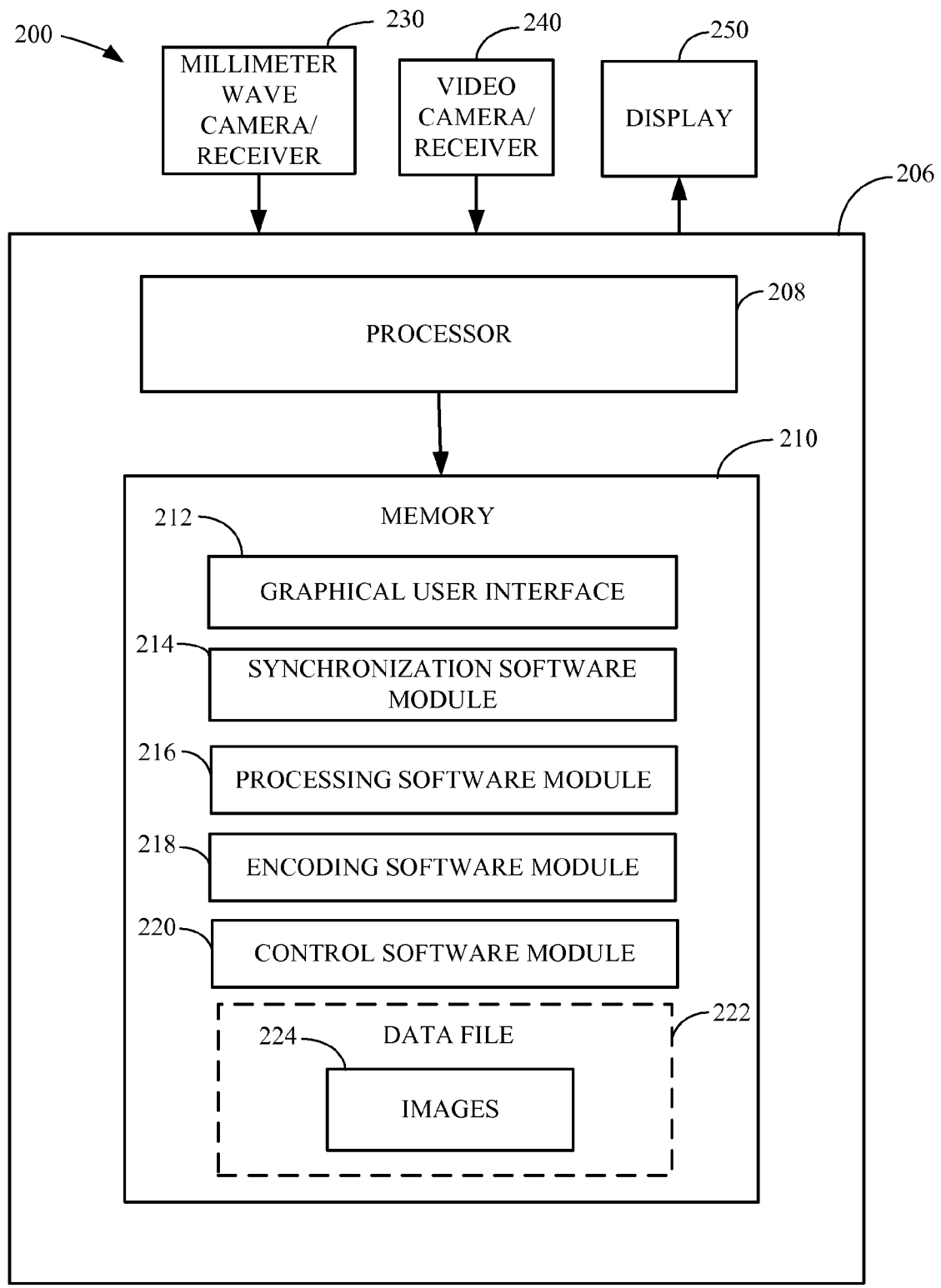
FIG. 2 is a block diagram of a particular illustrative embodiment of a system for manipulating real-time video playback time-synchronized with millimeter wave imagery.

A block diagram of a particular embodiment of a system for manipulating real-time video playback time-synchronized with millimeter wave imagery is disclosed in FIG. 2 and generally designated 200. In a particular embodiment, the system 200 may be configured to perform the methods depicted in FIG. 1. The system 200 includes a device 206 having at least one processor 208 and a memory 210 that is accessible to the processor 208. The memory 210 includes media that is readable by the processor 208 and that stores data and program instructions of software modules that are executable by the processor 208, including a graphical user interface for manipulating real-time playback time synchronized with millimeter wave imagery 212, a synchronization software module for synchronizing the visible spectrum imagery with the millimeter wave imagery 214, a processing software module for combining video imagery and millimeter wave imagery to generate composite images 216, an encoding software module for encoding images with event data indicating a threat 218 or recording into a datafile or database structure the indication of a threat 218, a control software module for controlling the viewing and playback of the imagery 220, and a data file 222 that includes recorded images 224. A millimeter wave camera and receiver 230, a video camera and receiver 240 and a display 250 are coupled to the device 206. In a particular embodiment, the graphical user interface 212 may include a keyboard, a pointing device, a touch screen, a speech interface, another device to receive user input, or any combination thereof.

Figure 3:
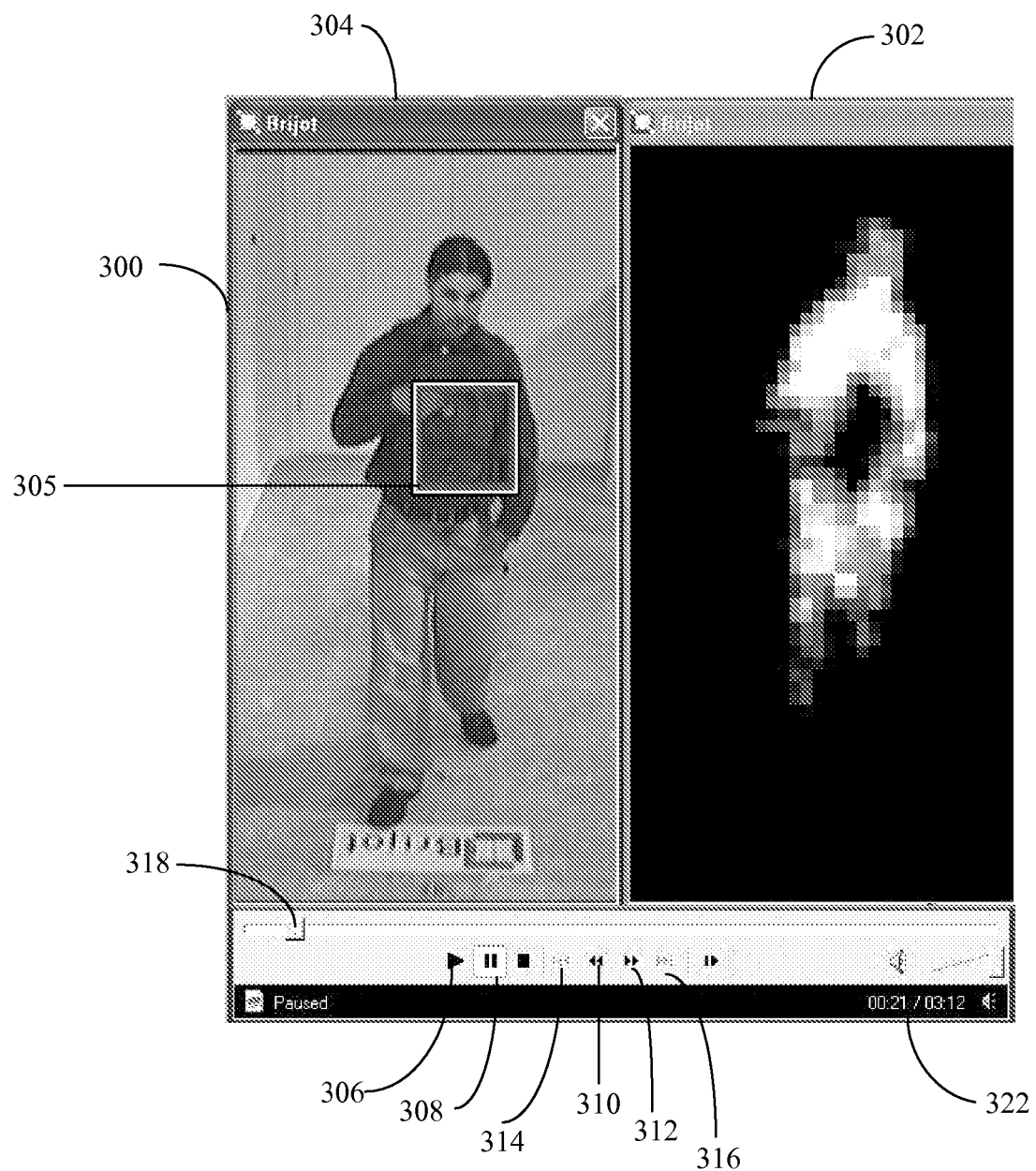
FIG. 3 is a screen shot of a particular illustrative embodiment of the graphical user interface incorporating the software modules of the invention.

With reference to FIG. 3, a particular embodiment of a GUI for system for manipulating real-time video playback time-synchronized with millimeter wave imagery is disclosed and generally designated 300. The real-time millimeter wave imagery 302 is shown on one portion of the GUI 300 and a real-time video image 304 is shown on a second portion of the GUI 300. As explained above, the images 302, 304 are also stored onto a memory device such as hard disk drive. Each image 302, 304 is encoded with a time stamp indicating the absolute or relative time the image was acquired or references such information by way of a datafile or database structure. Each image may also be encoded with other data such as threat presence/absence, threat highlights, sensitivity levels, analysis masks, etc. or this data can be stored into a datafile or database structure. A computer-generated visual cue, such as a rectangle, defines an area of a threat that was detected on the image. For example, in FIG. 3, a rectangular box 305 shown in the video image 304, corresponds to a hidden object on the person that is visible in the millimeter wave image 302. In addition to the integration and synchronization of visible color and millimeter wave imagery, the disclosed system and method could additionally and similarly integrate imagery from additional dissimilar sources such as x-ray, microwave, infra-red and ultra-violet imagers.

As part of the GUI 300 the operator is presented with a collection of controls to manage and manipulate the displayed images. The controls may include text, slider bars, buttons, and other typical GUI control elements. Significant amongst the controls are buttons for Play 306, Pause 308, Rewind 310, Forward Fast 312, Previous Event 314, and Next Event 316, as well as a slider bar 318 indicating position in a series, and time readout displays 322 indicating the time an image was taken.

The live video images received from the visible spectrum camera and the millimeter wave cameras are displayed on a video monitor (not shown). These images can be displayed side-by-side or as overlays in the same window with a user controlled opacity/translucency.

The user can pause the live video images thereby allowing the user additional time to scrutinize the images 302, 304. This feature can utilize the same location (window) on the GUI, replacing the live images with the paused images, or can utilize a different and separate location on the GUI so that the operator can view both the live images and the paused images simultaneously. The pause feature maintains the synchronism between the visible spectrum camera and the millimeter wave camera by pausing both images simultaneously.

The user can rewind the live or paused video images, allowing the user the opportunity to re-examine past images. This feature can utilize the same location (window) on the GUI, replacing the live images with the previous images, or can utilize a different and separate location on the GUI so that the operator can view both the live images and the previous images simultaneously. The rewind feature maintains the synchronism between the visible spectrum camera and the millimeter wave camera by rewinding both images simultaneously. In operation, when the operator locates the previous "footage" of images of interest, the operator would then activate the Play control to view the images from that point in time.

The user can also forward fast through recorded video images, allowing the user the opportunity to examine other sections of images, or "catch-up" to the present time.

This feature can utilize the same location (window) on the GUI 300, replacing the live images with the previous images, or can utilize a different and separate location on the GUI 300 so that the operator can view both the live images and the replayed images simultaneously. Similar to the rewind feature, the forward fast feature maintains the synchronism between the visible spectrum camera and the millimeter wave camera by advancing both images simultaneously.

Using the GUI 300, the user can skip forward or backward to the nearest "threat event" recorded via Previous Event 314 and Next Event 316 buttons of the GUI 300. A threat event is a section of video imagery where images that contain a possible threat object carried by a subject (gun, explosive, contraband, etc.) 305 are detected. Threat events are flagged as they are detected and then indicated as a data marker embedded in the recorded image file(s) or in a database structure. In addition to threat events, the disclosed system may be applied to other detection events, such as loss prevention/theft.

A separate Events Log or Events History feature may be employed which requires the user to exit the normal GUI section and visit a separate software area (window) with its own dedicated controls and look-and-feel. Alternatively, an Image or Events Search feature can be employed that requires the user to again exit the normal GUI section and visit a separate software area (window) with its own dedicated controls and look-and-feel.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method for manipulating real-time video playback time-synchronized with millimeter wave imagery, the method comprising:
   receiving input signals from at least one millimeter wave camera to generate real-time millimeter wave imagery;
   receiving input signals from at least one video camera to generate real-time visible spectrum video images spatially and temporally relative to the millimeter wave imagery;
   synchronizing the millimeter wave imagery with the video images to a substantially identical time base; and
   displaying the millimeter wave imagery and video images in real-time.

2. The method of claim 1 further comprising:
   combining the millimeter wave imagery and video images to generate real-time composite images of the millimeter wave imagery and video images; and
   displaying the composite images in real-time.

3. The method of claim 2 further comprising displaying a graphical user interface (GUI) to manage and manipulate the displayed millimeter wave imagery, video images and composite images.

4. The method of claim 3 further comprising automatically encoding the composite image with event data when a threat is detected, or storing said event data in a datafile or database structure.

5. The method of claim 3 further comprising recording the millimeter wave imagery, video images and composite images to a memory device.

6. The method of claim 5 further comprising accessing the memory device for selectively displaying portions of the recorded millimeter wave imagery, video images and composite images.

7. The method of claim 5 wherein the GUI controls displaying and reviewing user selected portions of the recorded millimeter wave imagery, video images and composite images.

8. The method of claim 4 wherein the threat is a detected explosive object, threat object, contraband object, stolen object or otherwise concealed object.

9. The method of claim 4 further comprising generating an alert when the threat is detected.

10. The method of claim 4 further comprising selectively displaying time frames of millimeter wave imagery, video images and composite images either encoded with data when a threat is detected or having stored the data in a datafile or database structure.

11. A system for manipulating real-time video playback time-synchronized with millimeter wave imagery, the system comprising:
    a millimeter wave receiver for receiving input signals received by at least one millimeter wave camera to generate millimeter wave imagery;

a video receiver for receiving input signals received by at least one visible spectrum video camera to generate video images spatially and temporally relative to the millimeter wave imagery;

a synchronization software module for synchronizing the millimeter wave imagery with the video images to a substantially identical time base; and a means for displaying the millimeter wave imagery and video images in real-time.

12. The system of claim 11 further comprising:

a processing software module for combining the millimeter wave imagery and video images to generate real-time composite images of the millimeter wave imagery and video images; and displaying the composite images in real-time.

13. The system of claim 12 further comprising a graphical user interface (GUI) to manage and manipulate the displayed millimeter wave imagery, video images and composite images.

14. The system of claim 13 further comprising an encoding software module for automatically encoding the composite image with event data when a threat is detected, or storing the event data in a datafile or database structure.

15. The system of claim 13 further comprising a memory device for recording the millimeter wave imagery, video images and composite images.

16. The system of claim 15 further comprising a control software module for accessing the memory device for selectively displaying and replaying portions of the recorded millimeter wave imagery, video images and composite images.

17. The system of claim 15 wherein the control software module controls displaying user selected portions of the recorded millimeter wave imagery, video images and composite images.

18. The system of claim 14 wherein the threat is a detected explosive object.

19. The system of claim 14 further comprising an alert when the threat is detected.

20. The system of claim 14 wherein the GUI further comprising a plurality of windows for viewing real-time and recorded millimeter wave imagery, video images and composite images.

* * * * *